United States Patent
Führer et al.

(10) Patent No.: US 6,709,356 B2
(45) Date of Patent: Mar. 23, 2004

(54) VEHICLE TRANSMISSION WITH PROGRESSIVE STEPPING

(75) Inventors: Gerhard Führer, Friedrichshafen (DE); Hermann Lanz, Frickingen (DE); Roland Stauber, Friedrichshafen (DE); Marcus Raeder, Bermatingen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/193,941

(22) Filed: Jul. 11, 2002

(65) Prior Publication Data

US 2003/0036452 A1 Feb. 20, 2003

(30) Foreign Application Priority Data

Jul. 25, 2001 (DE) .......................................... 101 36 231

(51) Int. Cl.[7] .............................................. F16H 37/02
(52) U.S. Cl. ........................ 475/207; 475/209; 74/325; 74/333
(58) Field of Search ................. 475/207, 208, 475/209, 214; 74/325, 331, 333, 334, 335

(56) References Cited

U.S. PATENT DOCUMENTS

| | | | | |
|---|---|---|---|---|
| 5,385,066 A | * | 1/1995 | Braun | .......................... 74/331 |
| 5,507,195 A | * | 4/1996 | Trick | ............................ 74/325 |
| 5,673,592 A | * | 10/1997 | Huggins et al. | .......... 74/336 R |
| 6,258,005 B1 | * | 7/2001 | Rohloff | ...................... 475/277 |
| 6,561,938 B1 | * | 5/2003 | Korner et al. | ................ 475/59 |

FOREIGN PATENT DOCUMENTS

| | | | | |
|---|---|---|---|---|
| DE | 4436083 A1 | * | 10/1995 | ........... B60K/17/08 |
| DE | 19809464 A1 | * | 9/1999 | ........... F16H/47/08 |
| DE | 198 31 293 A1 | | 1/2000 | ........... F16H/3/091 |
| EP | 0 769 641 A1 | | 10/1996 | ........... F16H/63/44 |

* cited by examiner

*Primary Examiner*—Tisha D Lewis
(74) *Attorney, Agent, or Firm*—Davis & Bujold PLLC

(57) ABSTRACT

In a transmission (2) for a motor vehicle with a main transmission part (22) which possesses a plurality of gear steps and wherein, between each step a step-jump in the gear ratio is provided, and with a split transmission part (40) for the separation of the step-jumps of the gear steps of the main transmission part (22) and with an area group transmission part (10) for the extension of the over-all gear ratio of the gear steps of the main transmission part 22 with a slow and a rapid gear ratio area, the average gear step-jump of the upper gear steps is approximately at least 0.7% less than the geometric step-jump calculated theoretically from the total gear ratio.

10 Claims, 2 Drawing Sheets

$$i_1 = i_{KL} * i_A * i_{GP}$$
$$i_2 = i_{KS} * i_A * i_{GP}$$
$$i_3 = i_{KL} * i_B * i_{GP}$$
$$i_4 = i_{KS} * i_B * i_{GP}$$
$$i_5 = i_{KL} * i_D * i_{GP}$$
$$i_6 = \text{direct} * i_{GP}$$
$$i_7 = i_{KL} * i_A$$
$$i_8 = i_{KS} * i_A$$
$$i_9 = i_{KL} * i_B$$
$$i_{10} = i_{KS} * i_B$$
$$i_{11} = i_{KL} * i_D$$
$$i_{12} = \text{direct}$$

Fig. 2

VEHICLE TRANSMISSION WITH PROGRESSIVE STEPPING

FIELD OF THE INVENTION

The invention concerns a motor vehicle transmission with a main transmission part and a group transmission.

BACKGROUND OF THE INVENTION

In practice, in many motor vehicle transmissions, progressively stepped gear ratio steps are preferred because of their advantages in regard to drivability. Accordingly, today, nearly all motor vehicle transmissions are progressively stepped in a 1-group construction, for instance, 5 and 6 gear transmissions made by different manufacturers. Progressive transmission staging means, in this connection, that the step-jumps become continuously smaller between the individual gears up to the higher gears and the accompanying greater speeds.

In the case of multiple group transmissions, the gear stepping can no longer be made ideally progressive over the entire ratio spectrum, since this mode of construction includes a multi-usage of individual gears, and must, therefore repeat some of the jumps between the steps. Thus, for example, in the case of 2-group transmissions with split groups, necessarily, each second gear jump must be identical. This step-jump relates exactly to the step-jump of the split group. With such a foundation, it followed that all transmission gears which were available, must also be shiftable. A concept-based disadvantage of this (6-gear+split group) is that from the standpoint of a mode of construction, this can be only offered as a fast-gear design.

By means of omitting individual gears, obviously, a kind of progressive gear staging can be arrived at, however, in this way, as a rule, the cost of construction increases, since the transmission, all together, must make more gears available than, as a matter of fact, are really useable, that is, necessary. It is this disadvantageous feature which relates to the size and the higher costs.

In the case of 2-group drives with a main transmission and an area group, today it has generally become conventional, to design easily progressive transmission stepping. Even in this case, the gear jumps, because of the construction, must repeat themselves after the shifting of the area group. The exception to this repetition is the creep gear, which can only be shifted into in the slow area group.

In the 12 and 16 gear transmissions, known today, built in the 3-group mode, wherein no intermediately placed gearing for intended progressive transmission staging is omitted, only approximate geometrical gear staging is known. On this account, certain, but not necessarily intended, deviations from the purely geometrical gear staging can arise. In practice, this only occurs within certain limits of selectable tooth count relationships of individual gear steps. Design can also be a limiting factor, for instance by means of the application of the same components as the area group or by use of definite gear-pairings.

Such a transmission, in 3-group-mode has been disclosed by DE 198 31 293, which has an essentially geometric step-jump between the individual gears. However, where the number of gear changes is not so great, for instance 12 changes, the purely geometric stepping of the transmissions in 3-group-mode of construction brings about a poorer drivability as compared to that of a similarly constructed transmission with a greater number of gear changes, for instance, 16 gears.

The purpose of the invention, is to set aside the existing disadvantages and to improve the ability of making gear changes.

SUMMARY OF THE INVENTION

In accordance with the invention, the proposal is, that in the case of a transmission for a motor vehicle with a principal transmission, which possesses a number of gear changes, and that between each gear change, a step-jump is in the gear ratio is provided, and has a split transmission, for the proportioning of the step-jump of its gear steps and possesses an area group gear drive for the extension of the entire gear ratio of its gear steps. With these named features, a slow gear ratio area and a rapid gear ratio area are formed, which allows the average step-jump of the upper gear steps to be about 0.7% smaller than would be arrived at from the theoretical geometric step-jump computed from the total gear ratio. In an advantageous embodiment, the step-jump at the shifting between the slow and the rapid area of the group transmission is at least 5% greater than that gear-jump theoretically derived from the geometrically given total gear ratio.

For a 3-group-mode transmission, the following theoretical step-jump can be derived by a strict geometrical stepping of the gears:

$$\varphi_{theor.} = \left(\frac{i_{Gear1}}{i_{Gearz}}\right)^{[1/(z-1)]}$$

where:
$z$ is the number of the gear changes, less an eventually present creep gear,
$i_{gear\,1}$ is the gear ratio of the first gear, less that of the said creep gear, and
$i_{gear\,z}$ is the gear ratio of the highest gear.

Where area group shifting is employed, the step-jump can be derived immediately from the ratio between the smallest, i.e., the most rapid gear ratio with the shifted, slow gear ratio area and the greatest, i.e., the slowest gear ratio with the shifted rapid gear ratio area of the area group transmission. An example would be in the case of a 16 gear transmission, namely the 9th gear and 8th gear.

$$\varphi_{Group} = \left(\frac{i_{minGP-L}}{i_{maxGP-S}}\right)$$

The proposed solution is based on the concept, to so select the individual gear ratios in the case of a 3-group-mode transmission which intentionally deviate from the strict geometric stepping, that a progressive gear stepping is achieved. For the variations of the individual gear ratios, the following criteria were established.

The step-jumps in the upper gears, in dependency of the number of gears, were knowingly smaller than those theoretically chosen for step-jump from a purely geometric gear stepping. Accordingly, the average step-jump of the upper gears is at least 0.7% smaller than the theoretical step-jump:

$$\frac{4}{z} \cdot \sum_{i=1}^{n=\frac{z}{4}} \left(\frac{i_{Gear(z-i)}}{i_{Gear(z-i+1)}}\right) \leq 0.993 \cdot \varphi_{theor.}$$

This is valid for z=16, 12 and 8.

This fine gear stepping is immediately enabled in the upper gears by means of an step-jump increased in size by shifting in the area group. The gear stepping is at least 5% greater than the theoretical step-jump:

$$\phi_{Group} \geq 1.05 \cdot \phi_{theor.}$$

The following table provides, as an example, the gear ratios and the step-jumps of such a progressive, stepped 12-gear-transmission:

| Transmission | Gear Ratio | Step-Jump |
|---|---|---|
| 1. Gear | 12.79 | |
| | | 1.24 |
| 2. Gear | 10.33 | |
| | | 1.29 |
| 3. Gear | 8.03 | |
| | | 1.24 |
| 4. Gear | 6.49 | |
| | | 1.25 |
| 5. Gear | 5.18 | |
| | | 1.24 |
| 6. Gear | 4.18 | |
| | | 1.37 |
| 7. Gear | 3.06 | |
| | | 1.24 |
| 8. Gear | 2.47 | |
| | | 1.29 |
| 9. Gear | 1.92 | |
| | | 1.24 |
| 10. Gear | 1.55 | |
| | | 1.25 |
| 11. Gear | 1.24 | |
| | | 1.24 |
| 12. Gear | 1.00 | |

From the stated values, there resulted a theoretical step-jump of 1.261. The proposed solution offered fine gear stepping in the upper driving gears as well as in the most frequently encountered constant driving area. By means of a reduced cost of construction, with less gear steps, the drivability requirements can be fulfilled. A reduced fuel consumption is also evident, in relation to a geometrically stepped transmission. In practice, the larger step-jump by means of the area group at lower driving speeds is attained without any relevant disadvantages. The difference of the individual step-jumps from gear to gear also have, in practice, especially in the case of automated transmissions, no consequential disadvantages.

This invention is especially advantageous for 12-gear-transmissions with 3-group-mode. In this way, a 12-gear-transmission designed in accord with the invention can attain the drivability of a 16-gear-transmission with a clearly reduced cost of construction.

BRIEF DESCRIPTION OF THE DRAWINGS

The invention will now be described, by way of example, with reference to the accompanying drawings in which:

FIG. 2 is a gear ratio series for a transmission in accord with FIG. 1.

DETAILED DESCRIPTION OF THE INVENTION

Figure 1:
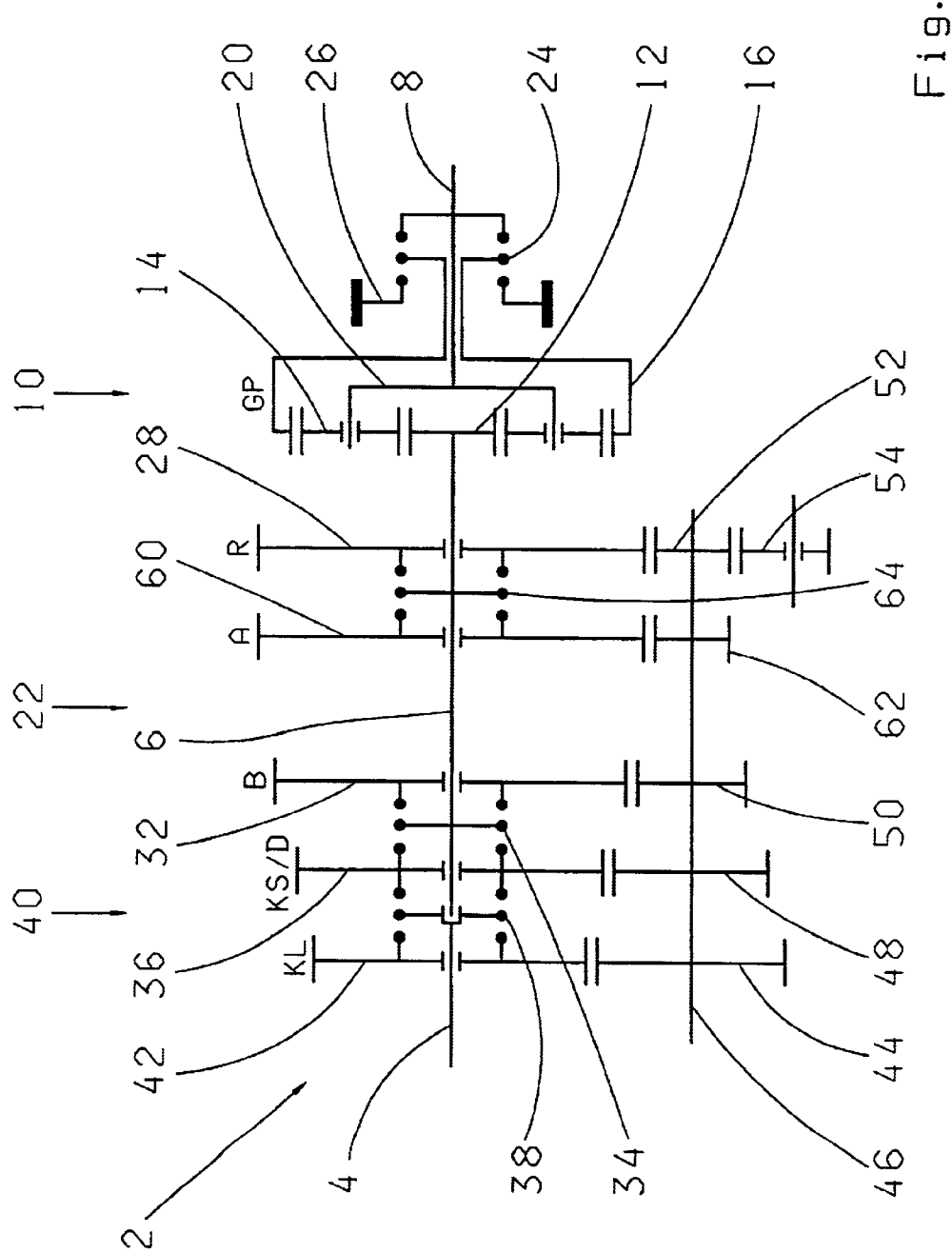
FIG. 1 is a transmission schematic for a direct gear train with 12 gears.

FIG. 1 shows a transmission 2 in a 3-group-mode in a 12-gear variant. An input shaft 4 is coaxial to a main shaft 6 of a main transmission part 22. At the output end of the main shaft 6 is provided an area group transmission part 10, which is designed as a planetary gear set. The sun gear 12 meshes with the planet gears 14, which are borne upon a planetary carrier 20. The planetary gears 14 mesh in turn with an internal gear 16, which, by means of a shifting device 24 can be affixed either with the housing 26 or with the output shaft 2. The output shaft 8 is connected with the planetary carrier 20. On the main shaft 6 is to be found a reverse gear 28, which by means of a shifting device 64 is non-turnably affixed to the main shaft 6.

The main shaft 6 further carries a gear 32, which by means of a shifting device 34 is made non-turnably fixed to the main shaft 6. An additional meshing gear-pair is comprised first of gear 60, which is turnable, but carried loose on the main shaft 6 and second, gear 62 which is non-turnably affixed to a counter shaft 46. A shifting device 64, however, is provided to cause the gear 60 to be non-turnably affixed to the main shaft 6.

A further gear 36 on the main shaft 6 also can be connected with the input shaft 4 by means of the shifting device 38 in the split transmission part 40. The input shaft 4 carries a gear 42 which is freely turnable in relation to the said input shaft. This gear 42 engages gear 44 of the counter shaft 46 of the main transmission 22. On the end of its axle proximal to the main transmission 22, the input shaft 4 carries shifting device 38, which enables the input shaft 4 to be turnably fixed for the purpose of torque transfer either with, first, the said loose turning gear 42, or second, with the loose gear 36 which is on the main shaft 6 of the main transmission 22. The first gear-pairing with the loose gear 42 on the input shaft 4 and the therewith meshing gear 44 on the counter shaft 46 is frequently referred to as the first constant, or Constant I (KL), while the second gear-pairing, consisting of the loose gear 36 placed on the main shaft 6 the gear 48, on the counter shaft 46, which meshes therewith is designated as the second constant, or Constant II (KS/D). With the aid of the shifting device 38 either the Constant I or the Constant II is engaged into the torque transfer. A further gear 50 on the counter shaft 46 meshes with the gear 32 and a gear 52 on the counter shaft 46 meshes with a reverse gear 54, which again meshes with the gear 28. A further gear-pair consists of the gear 60 which is turnably loose on the main shaft 6 and with the gear 62 which is turnably fixed with the counter shaft 46. For a turnably fixed connection of the gears 60 and 28 with the main shaft 6, there has been provided the shifting device 64.

FIG. 2 shows as an example a formulation of the sequence of gear ratios of a 12-gear transmission with a transmission schematic in accord with FIG. 1. It is shown here, that for the first six stages of the group transmission part 10, the shifting is respectively in the slow gear ratio stage. From the seventh gear, the group part 10 is shifted into the rapid gear ratio stage and remains in that position for the remaining gears, which cannot be changed again. In the stages seven to twelve, the same gears 32, 36, 42 and 60 shift as in the stages one to six, only with the rapid gear ratio stage in the group transmission part 10.

Reference Numbers and Components
2 Transmission
4 Input shaft
6 Main shaft
8 Output shaft
10 Group transmission part (area)
12 Sun gear of planetary set
14 Planet gears
16 Internal gear
20 Planetary gear carrier
22 Main transmission part
24 Shifting device 26 Housing
28 Reverse gear (toothed)
32 gear
34 Shifting device
36 Gear
38 Shifting device
40 Split transmission part
42 Gear
44 Gear
46 Counter shaft
48 Gear
50 Gear
52 Gear
54 Reverse stage gear
60 Gear
62 Gear
64 Shift device
KL First Constant
KS Second Constant

What is claimed is:

1. A transmission (2) for a motor vehicle having a main transmission part (22) possessing a plurality of gear steps with a gradation in the gear ratio being provided between each gear step, a split transmission part (40) for separation of the gradations of the main transmission part (22), and a group transmission (10) with a low gear range and a high gear range to extend an over-all gear ratio of the gradations of the main transmission part (22), wherein an average gradation between the gear steps of the high gear range is at least about 0.7% less than the corresponding gradation calculated theoretically from the over-all gear ratio.

2. The transmission (2) according to claim 1, wherein the average gradation between the low gear ratio of the group transmission (10) is at least about 5% greater than the corresponding high gear ratio calculated from the over-all gear ratio.

3. The transmission according to claim 1, wherein a maximum step, between any successive pair of gears, is equal or less than 0.13.

4. A transmission comprising:

a main transmission part (22) having a plurality of gear ratios;

a split transmission part (40) for separating the gear ratios of the main transmission part (22); and a group transmission part (10) for extending the gear ratios of the main transmission part (22) into a low range of gear ratios and a high range of gear ratios;

wherein successive gear ratios of the main transmission part (22) are progressively stepped; and an average gradient of the gear ratios in at least the high range of gear ratios is approximately 0.7% less than those obtained with geometrically related gear ratios.

5. The transmission according to claim 4, wherein a gear ratio step between a highest gear ratio of the lower range of gear ratios and a lowest gear ratio of the upper range of gear ratios is approximately 5% greater than that obtained by geometrically related gears.

6. The transmission according to claim 4, wherein a maximum step, between any successive pair of gears, is equal or less than 0.13.

7. A 12 speed transmission comprising:

a main transmission part (22) having a plurality of gear ratios;

a split transmission part (40) for separating the gear ratios of the main transmission part (22); and a group transmission part (10) for extending the gear ratios of the main transmission part (22) into a low range of gear ratios and a high range of gear ratios;

wherein successive gear ratios of the main transmission part (22) and the split transmission part (40) are progressively stepped; and an average gradient of the successive gear ratios of the main transmission part (22) and the split transmission part (40) is approximately 0.7% less than those obtained with geometrically related gear ratios.

8. The transmission according to claim 7, wherein a gear ratio step between a highest gear ratio of the lower range of gear ratios and a lowest gear ratio of the upper range of gear ratios is approximately 5% greater than that obtained by geometrically related gears.

9. The transmission according to claim 7, wherein a maximum step, between any successive pair of gears, is equal or less than 0.13.

10. The transmission according to claim 7, wherein the group transmission part (10) is a planetary transmission.

* * * * *